United States Patent [19]

Kadokura et al.

[11] Patent Number: 5,099,372
[45] Date of Patent: Mar. 24, 1992

[54] MAGNETIC HEAD ASSEMBLY FOR A FLEXIBLE MAGNETIC DISK DRIVE UNIT

[75] Inventors: Sadao Kadokura, Hachioji; Kazuhiro Kamei; Kazuhiko Honjyo, both of Hino, all of Japan

[73] Assignee: Teijin Limited, Osaka, Japan

[21] Appl. No.: 386,432

[22] Filed: Jul. 27, 1989

Related U.S. Application Data

[62] Division of Ser. No. 54,517, May 27, 1987, Pat. No. 4,858,043.

[30] Foreign Application Priority Data

May 28, 1986 [JP] Japan ................. 61-121268

[51] Int. Cl.$^5$ ............................................. G11B 5/22
[52] U.S. Cl. ............................ 360/99.01; 360/130.34
[58] Field of Search ............... 360/97.01, 99.01, 99.05, 360/104, 130.34, 130.3

[56] References Cited

U.S. PATENT DOCUMENTS

| | | | |
|---|---|---|---|
| 3,990,111 | 11/1976 | Elliott | 360/99.05 |
| 4,074,331 | 2/1978 | O'Reilly et al. | 360/104 |
| 4,652,960 | 3/1987 | MacDonald, II | 360/130.34 |
| 4,710,831 | 12/1987 | Nishimura | 360/99 |
| 4,858,043 | 8/1989 | Kadokura et al. | 360/99.01 |

FOREIGN PATENT DOCUMENTS

| | | |
|---|---|---|
| 59-3748 | 1/1984 | Japan ................. 360/130.34 |
| 59-215073 | 12/1984 | Japan ................. 360/130.34 |
| 60-22768 | 2/1985 | Japan . |
| 60-061950A | 4/1985 | Japan ................. 360/130.34 |
| 60-179961 | 9/1985 | Japan ................. 360/130.34 |
| 60-202504 | 10/1985 | Japan . |
| 60-202507 | 10/1985 | Japan . |
| 60-253009 | 12/1985 | Japan . |
| 61-48182 | 3/1986 | Japan . |
| 61-133002 | 6/1986 | Japan . |
| 1467218 | 3/1977 | United Kingdom . |

*Primary Examiner*—John H. Wolff
*Attorney, Agent, or Firm*—Kenyon & Kenyon

[57] ABSTRACT

A magnetic head assembly for a flexible magnetic disk drive unit has a magnetic recording and retrieving head for carrying out magnetic recording onto and retrieving from a metallic thin-film type flexible magnetic medium rotating about a center of the medium by coming into contact with the medium at a contact position, a first group of non-magnetic supporting pads arranged to support a plurality of positions of the flexible magnetic medium and disposed so as to surround the contact position, and a second group of non-magnetic suppressing pads in contact with a different plurality of positions of the flexible magnetic medium outward of the plurality of supporting positions so that the suppressing pads suppress any undulation of the flexible magnetic medium during rotation of the medium. The support pads and the magnetic recording and retrieving head may be formed with a recess, respectively, for trapping dust and other foreign materials, thereby preventing an accumulation of dust and other foreign materials between the head and the medium.

12 Claims, 10 Drawing Sheets

THE MAXIMUM UNDULATION: 55μm

THE MAXIMUM UNDULATION: 110μm

Fig. 27
Fig. 28
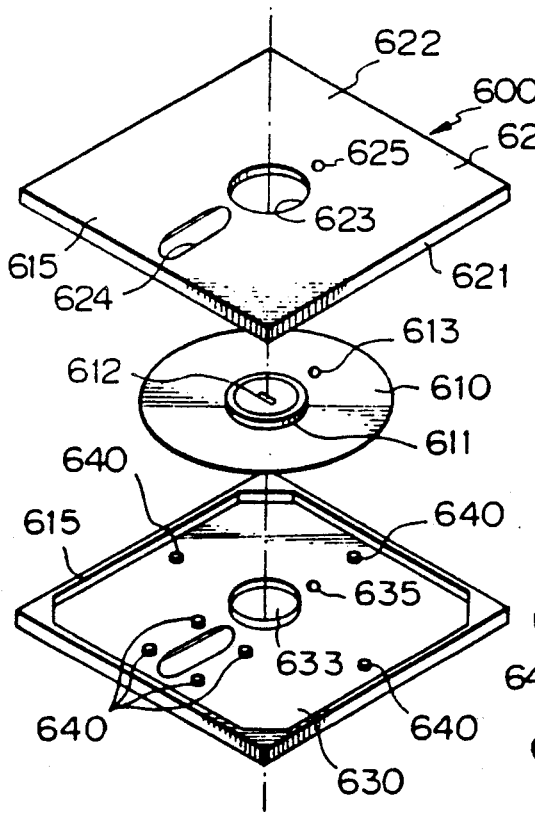
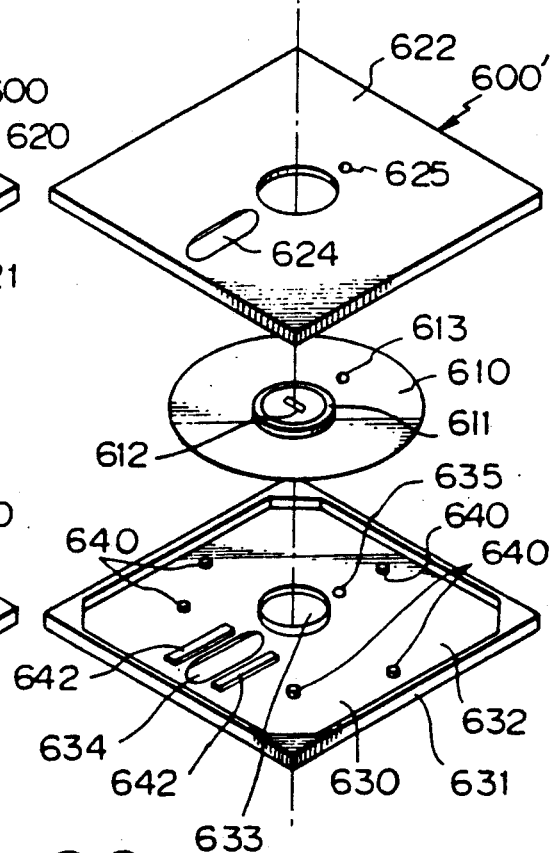
Fig. 29
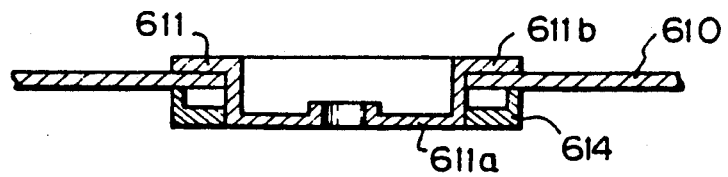
Fig. 30
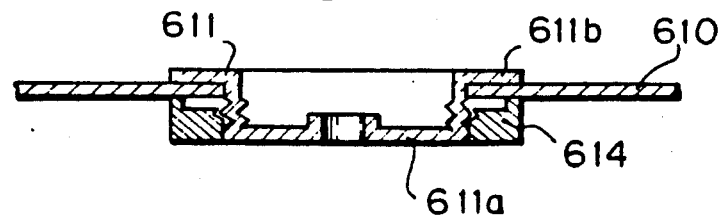

MAGNETIC HEAD ASSEMBLY FOR A FLEXIBLE MAGNETIC DISK DRIVE UNIT

This is a divisional of copending application Ser. No. 07/054,517 filed on May 27, 1987 now U.S. Pat. No. 4,858,043.

BACKGROUND OF THE INVENTION

1. Field of the Invention

The present invention relates to a magnetic head assembly for a flexible magnetic disk drive unit. More particularly, it relates to a magnetic head assembly having a magnetic recording and retrieving head or heads brought into contact with a flexible magnetic recording disk consisting of a metallic thin-film type magnetic recording medium for carrying out magnetic recording on and retrieving information from the flexible magnetic disk.

2. Description of the Related Art

A flexible magnetic disk drive unit employing a flexible magnetic recording medium, such as a floppy disk unit or a micro-disk unit used as a secondary information storage unit for an electronic computer, is well known.

Recently, the demand for high density recording on the flexible magnetic recording medium has increased. To meet this demand, instead of the conventional flexible magnetic medium having a magnetic recording layer coated on the surface of a flexible nonmagnetic base by the use of a conventional binder, there has been proposed a metallic thin-film type flexible magnetic recording medium using, as a magnetic recording layer, a strongly magnetic metallic thin-film or a metallic thin-film formed by a sputtering method, such as a cobalt system alloy film having a perpendicular magnetic anisotropy as disclosed in Japanese Examined Patent Publication No. 58-91 (corresponding to U.S. Pat. No. 4,210,946), or Japanese Unexamined Patent Publication No. 61-5404. However, when employing the metallic thin-film as a magnetic recording layer of the flexible magnetic recording medium, a problem arises in that, as a conventional magnetic head assembly having a magnetic read/write head, a magnetic erase head and pressure pads must be subjected to a large frictional resistance when in contact with the metallic thin-film, the magnetic heads as well as the magnetic recording medium are worn and damaged by this friction. As a result, both the magnetic heads and the medium are not sufficiently durable and do not have a long operational life. Particularly, when the conventional flexible magnetic disk drive unit is employed for a magnetic recording on both sides of the flexible magnetic recording medium having the above-mentioned metallic thin-film recording layers on both surfaces thereof, the problem of a sufficient durability, and an additional problem of stability in contact between the magnetic head assembly and both sides of the flexible magnetic recording medium, become more critical and stringent. As a result, the conventional flexible magnetic disk drive unit cannot be practically applied as a double-sided magnetic flexible disk drive unit for the metallic thin-film type magnetic flexible recording medium. Therefore, provision of a practically applicable magnetic head assembly capable of being accommodated in the flexible magnetic disk drive unit for a metallic thin-film type magnetic recording medium is demanded.

When the above-mentioned metallic thin-film having a perpendicular magnetic anisotropy is used for forming a magnetic recording layer or layers of a flexible magnetic recording medium or disk, a magnetic read/write head per se must have sufficient durability to ensure a long operational life, and must be highly sensitive during perpendicular magnetic recording and retrieving. Also, a magnetic flexible disk cartridge containing the above-mentioned metallic thin-film type magnetic recording medium therein must be held in a casing in such a manner that stable magnetic recording and retrieving operations can be carried out over a long operational life.

SUMMARY OF THE INVENTION

Therefore, an object of the present invention is to obviate the problems encountered by the conventional magnetic head assembly for a flexible magnetic recording medium.

Another object of the present invention is to provide a flexible magnetic disk drive unit provided with a magnetic head assembly having a long operational life and able to maintain a stable contact between a magnetic head or heads and a single-sided or double-sided metallic thin-film type flexible magnetic recording medium, especially the medium which is susceptible to a perpendicular magnetization.

A further object of the present invention is to provide a magnetic recording head including at least a magnetic read/write head having an improved magnetic recording and retrieving sensitivity as well as an excellent and long operation life, and adapted for accommodation in a flexible magnetic disk drive unit for a metallic thin-film type magnetic recording medium.

A still further object of the present invention is to provide a flexible magnetic recording disk cartridge having a magnetic flexible disk in a casing in such a manner that the flexible magnetic recording disk exhibits a longer operational life and better stable recording and retrieving characteristics when used with the flexible magnetic disk drive unit provided with the magnetic head assembly stated in the afore-mentioned object.

In accordance with the present invention, there is provided a flexible magnetic disk drive unit including a magnetic head assembly for carrying out a magnetic recording onto and retrieving information from a flexible magnetic disk having a metallic thin-film type recording layer thereon and encased in a jacket means. The magnetic head assembly comprises: a magnetic recording and retrieving head unit having at least one magnetic recording and retrieving head arranged on one side of the flexible magnetic disk, capable of being in contact with the metallic thin-film type recording layer of the flexible magnetic disk for the magnetic recording and retrieving operations, and a first pad unit arranged to support the flexible magnetic disk from a side opposite to the side where the magnetic recording and retrieving head unit is arranged, the first pad unit including a plurality of supporting pads disposed so as to surround a contact position where contact between the magnetic recording and retrieving head with the flexible magnetic disk takes place, each of the supporting pads having a contact end face arranged so as to be in sliding contact with the flexible magnetic disk. According to research and experiments by the present inventors, the metallic thin-film type magnetic recording medium can exhibit an elastic property. This elastic property of the metallic thin-film type magnetic recording medium and the above-mentioned disposition of the plurality of supporting pads surrounding the contact position where contact between the magnetic recording and retrieving head with the flexible magnetic disk takes place, are very effective for establishing a stable contact between the flexible magnetic recording medium and the magnetic recording and retrieving head unit during the recording and retrieving operation, and for overcoming the problems of frictional wear and damage of the magnetic head assembly and the flexible magnetic recording medium. That is, since the flexible magnetic recording medium is elastically flexible, and since the medium is not locally sandwiched by the magnetic recording and retrieving head unit and the supporting pads, the contact between the flexible magnetic recording medium and the magnetic recording and retrieving head unit during the recording and retrieving operation can be lightened.

Preferably, the magnetic head assembly for the flexible magnetic disk drive unit further comprises a second pad unit arranged so as to restrict or suppress an undulating motion of the flexible magnetic disk which occurs during the rotational movement of the flexible magnetic disk. The second pad unit includes a plurality of suppressing pads arranged outward of the plurality of supporting pads of the first pad unit with respect to the contact position where contact between the magnetic recording and retrieving head with the flexible magnetic disk takes place, each of the suppressing pads of the second pad unit having an end face arranged so as to be in sliding contact with the flexible magnetic disk while the flexible magnetic disk is rotating. The provision of the suppressing pads effectively reduces any change in mechanical impact force when the magnetic recording and retrieving head unit is in sliding contact with the flexible magnetic recording medium while the medium is rotating. Thus, the durability and operational reliability of the magnetic recording and retrieving head as well as the flexible magnetic recording medium can be enhanced.

The metallic thin-film type flexible magnetic recording medium or disk for which the magnetic head assembly according to the present invention is adapted may have a flexible base of an organic polymer film, such as of polyethylene terephthalate film, polyethylene naphthalate film, or polyimide film, a magnetic recording layer applied onto the flexible base which is formed by a strongly magnetic metallic thin-film, such as an iron system thin-film, cobalt system thin-film or nickel system thin-film, and a protective layer. Particularly, the magnetic head assembly according to the present invention may be advantageously used with a perpendicular magnetic recording medium having a perpendicular magnetic recording layer which is susceptible to a perpendicular magnetization and has a high recording density. The perpendicular magnetic recording layer is constituted by an alloy film, such as a cobalt-chrome alloy film, a cobalt-chrome-tantalum alloy film, a cobalt-vanadium alloy film, or a cobalt oxide alloy film, applied onto the flexible base substrate directly or via a high magnetic permeable layer formed by an alloy film, such as a permalloy film, a cobalt-tantalum alloy film, a cobalt-zirconium alloy film, a cobalt-zirconium-niobium alloy film, or a cobalt-zirconium-tantalum alloy film. Preferably, the above-mentioned magnetic recording layer of the perpendicular magnetic recording medium is covered with a 50 through 500 Å thick protective layer to enhance the abrasion resistant property of the magnetic recording medium with which the magnetic head assembly of the present invention is used. The protective layer may be formed by a non-magnetic metallic oxide, such as a cobalt oxide, a silicone oxide, or a copper oxide.

The magnetic recording and retrieving head employed in the magnetic head assembly of the present invention may be any known kind of magnetic recording and retrieving head, such as a conventional ring type magnetic head or a perpendicular magnetic head. Namely, the magnetic recording and retrieving head has a main magnetic pole, an excitation coil wound on a magnetic core, and a head slide. Preferably, the magnetic recording and retrieving head has a sliding contact face formed as a spherical surface at an end of the head slide so that the concentration of an impact force on the sliding contact face of the magnetic recording and retrieving head is prevented. The radius of curvature of the spherical surface is set at a value experimentally selected from several millimeters through several hundred millimeters, depending on the flexible magnetic recording mediums to be used. When the recording density of the flexible magnetic recording medium used is more than 50 KFRPI (Kilo Flux Reversal Per Inch), the radius of curvature of the spherical surface of the magnetic recording and retrieving head is preferably set at a value equal to or less than 10 millimeters, and the surface area of the end face of the magnetic recording and retrieving head should be as small an area as at most 1 millimeter square to several millimeters square, from the point of view of stable magnetic recording and retrieving. Alternatively, the sliding contact face of the end of the head slide may be formed as a cylindrical surface, as employed in the conventional magnetic head for a video tape recorder. The head slide may be made of a conventionally employed material, such as a ferrite system ceramic, a glass system ceramic, or an alumina system ceramic. That is, the material preferably should have a good thermal conductivity and have a sufficient hardness from the point of view of durability. Preferably, the head slide should be formed with at least one recess arranged adjacent to the main magnetic pole for trapping dust and other foreign materials therein during the magnetic recording and retrieving operation with the metallic thin-film type flexible magnetic recording medium.

The supporting pads and suppressing pads of the first and second pad units should be strong enough to endure sliding contact with the flexible magnetic recording medium or disk for a long period of time, and be able to exhibit good sliding contact characteristics. Thus, preferably, the configuration of the contact end face should have a circular cross-section along a plane perpendicular to the contacting flexible magnetic recording disk and in parallel with the sliding direction of the first and second pad units. Most preferably, the configuration of the contact end face of the supporting and suppressing pads of the first and second pad units should be spherical, similar to that of conventional button pads. The entire shape of the supporting and suppressing pads of the first and second pad units may be cylindrical, conical, or pyramidal. The suppressing pad of the second pad unit may also have a semi-barrel shape. Both supporting and suppressing pads must be hard and thermally conductive, and preferably made of an abrasion resistant material having sufficient strength to support the spinning flexible magnetic recording disk. Thus, a crystallized glass, alumina system ceramics, or a material having a surface hardened by a titanium nitride, may be used for producing the supporting and suppressing pads of the first and second pad units. The supporting pads of the first pad unit are arranged so as to be spaced apart from one another and to surround a contact position where contact between the magnetic recording and retrieving head unit with the spinning flexible magnetic recording disk takes place. At least two supporting pads should be arranged so as to support two separate positions on both sides of the above-mentioned contact position. Preferably, the supporting pads of the first pad unit are disposed at a plurality of supporting positions on a circle or concentric circles with a center thereof located at the position where the magnetic recording and retrieving head unit is in contact with the flexible magnetic disk. The plurality of supporting positions should be symmetrically distributed on both sides of a line substantially tangent to a circle having a center corresponding to a rotation center of the flexible magnetic disk and passing through the contact position. The number and disposition of the supporting pads of the first pad unit is determined by the physical characteristics of the flexible magnetic recording medium to be supported. The spacing between two adjacent supporting pads should be determined by taking the elasticity of the flexible magnetic recording medium into consideration. The plurality of supporting pads of the first pad unit may be either individual pad elements or integrally formed as one part. The suppressing pads of the second pad unit are provided to restrict or suppress undulating motion of the flexible magnetic recording medium during the rotation thereof, so that a flat rotational condition of the flexible magnetic recording medium is maintained when the medium comes into contact with the magnetic recording and retrieving head unit. Therefore, the plurality of suppressing pads of the second pad unit are arranged outward of the plurality of the supporting pads of the first pad unit. The plurality of the suppressing pads of the second pad unit are preferably disposed in such a manner that one group of the suppressing pads is located on one side of the contact position where contact between the magnetic recording and retrieving head with the flexible magnetic recording medium takes place, with respect to the rotational direction of the medium, and the other group of the suppressing pads is located on the other side of the above-mentioned contact position. Additional suppressing pads of the second pad unit may be disposed on both sides of the contact position in the radial direction of the flexible magnetic recording medium with respect to the rotational center of the medium, as required.

Preferably, the supporting and suppressing pads of the first and second pad units are commonly arranged on a carriage unit for holding the magnetic recording and retrieving head unit, so that the magnetic head assembly of the present invention may be compact, and so that a stable recording and retrieving may be achieved. Alternatively, the suppressing heads of the second pad unit may be separately arranged on either a separate stationary part of the magnetic flexible disk drive unit or the jacket of each flexible magnetic recording medium, to reduce the weight of the carriage unit that must be quickly moved relative to the flexible magnetic recording medium. When the suppressing pads of the second pad unit are arranged on the separate stationary part of the magnetic flexible disk drive unit, they should be disposed so as to be in contact with a plurality of radial positions of an entire recording part of the flexible magnetic recording medium, which appears in the head window of the jacket of the flexible magnetic recording medium, circumferentially on both sides of the contact position where contact between the magnetic recording and retrieving head unit with the flexible magnetic recording medium takes place. The suppressing pads then may be a plurality of button type pads, but preferably, are constituted by a pair of semi-barrel type pads extending continuously and radially of the flexible magnetic recording disk, to permit a stable movement of the magnetic recording and retrieving head unit in the radial direction of the flexible magnetic recording disk by the carriage unit.

Since the magnetic head assembly for the flexible magnetic disk drive unit is mainly intended for use with the metallic thin-film type magnetic recording medium or disk having a hard protective layer, the magnetic recording and retrieving head and the supporting and suppressing pads must have hard contact end faces, respectively, so that the durability of both the magnetic head assembly and the magnetic recording medium is enhanced. Thus, the end contact faces of the supporting and suppressing pads of the first and second pad units should have a Vickers hardness equal to or more than 500.

When the magnetic recording and retrieving head unit and the first and second pad units are commonly arranged on the carriage unit, at least one of the magnetic recording and retrieving head unit and the first and second pad units should be appropriately held on the carriage unit by an appropriate shock absorbing means and/or spring means, so that a flexible contact between the magnetic recording and retrieving head unit and the flexible magnetic recording medium is established, and so that a replacement of one flexible magnetic recording medium with another flexible magnetic recording medium can be safely carried out.

When the magnetic head assembly of the present invention is used with a double-sided flexible magnetic recording medium or disk, the magnetic recording head unit should have a pair of magnetic recording and retrieving heads arranged on both sides of the medium or disk. The first and second pad units also should be arranged on both sides of the medium and disk. With this arrangement, one of the magnetic recording and retrieving heads preferably is arranged at a position at which it can act as a supporting pad with respect to the other magnetic recording and retrieving head.

BRIEF DESCRIPTION OF THE DRAWINGS

The above and other objects and advantages of the present invention will be made more apparent from the ensuing description of the preferred embodiments with reference to the accompanying drawings wherein

FIG. 27 is an exploded view of a flexible disk cartridge according to an embodiment of the present invention;

FIG. 28 is an exploded view of a flexible disk cartridge according to another embodiment of the present invention;

FIG. 29 is a cross-sectional view of a hub portion of the disk of FIG. 27 or 28, illustrating the mounting construction of the disk; and, FIG. 30 is a cross-sectional view of another hub portion of the disk of FIG. 27 or 28.

DESCRIPTION OF THE PREFERRED EMBODIMENTS

Figure 1:
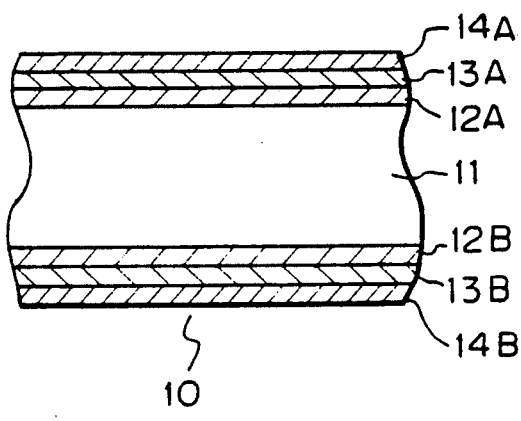
FIG. 1 is a partial cross-sectional view of a metallic thin-film type magnetic recording medium with which a magnetic head assembly can be used.
Figure 2:
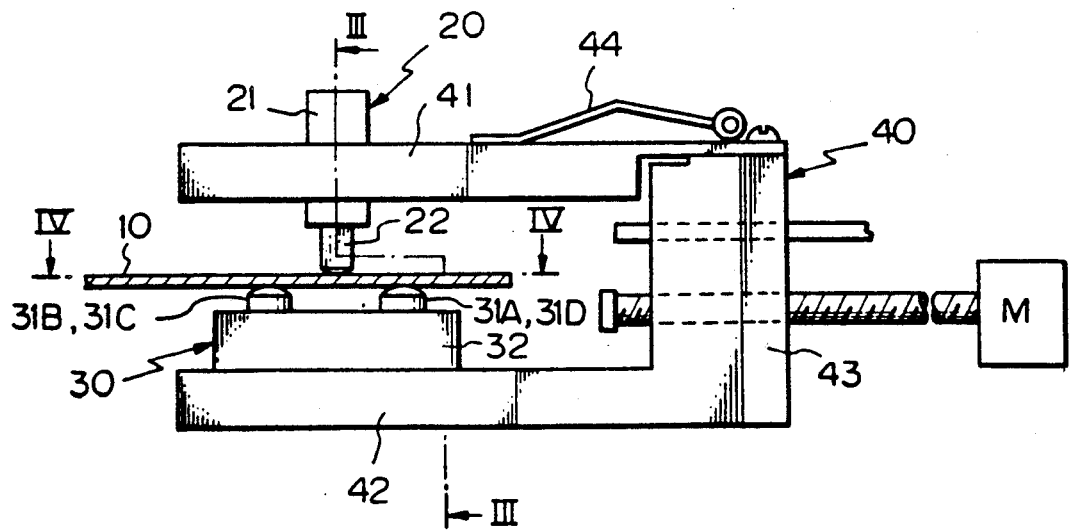
FIG. 2 is a schematic front elevational view of a magnetic head assembly for a flexible magnetic disk drive unit according to a first embodiment of the present invention.
Figure 3:
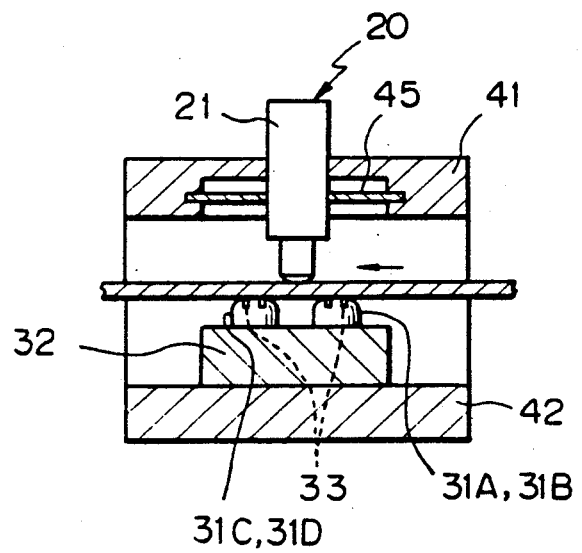
FIG. 3 is a cross-sectional view taken along the line III—III of FIG. 2.

Referring to FIG. 1 illustrating the construction of a typical flexible magnetic recording disk with which a magnetic head assembly for a flexible magnetic disk drive unit of the present invention can be used, the flexible magnetic recording disk may be formed as, for example, a 3.5 inch double-sided perpendicular magnetic recording medium 10, and is provided with a flexible base film 11 made of polyester film 50 microns thick. The surface roughness (the average center line roughness Ra according to Japanese Industrial Standard B 0601) of the polyester film is 20 Å when measured by a roughness measuring instrument, i.e., an alpha step 200 of the Tencor Instrument Company of the U.S.A. On both sides of the flexible base-film 11, the medium 10 is provided with high magnetic permeable layers 12A and 12B formed by 0.5 microns thick Ni-Fe-Mo alloy layers having a magnetic coercive force of approximately 3 Oersteds, magnetic recording and retrieving layers 13A and 13B formed by 0.15 microns thick Co-Cr alloy layers having a perpendicular magnetic coercive force of approximately 600 Oersteds and a saturation magnetization of approximately 500 emu/cc, and protective layers 14A and 14B made of an 0.02 microns thick coating of tricobalt tetroxide ($Co_3O_4$). The formation of the respective layers is achieved by the opposed target type sputtering method disclosed in U.S. Pat. No. 4,407,894. The double-sided perpendicular magnetic recording medium 10 is usually encased in a jacket and used as a flexible magnetic disk cartridge, as described later.

Figure 4:
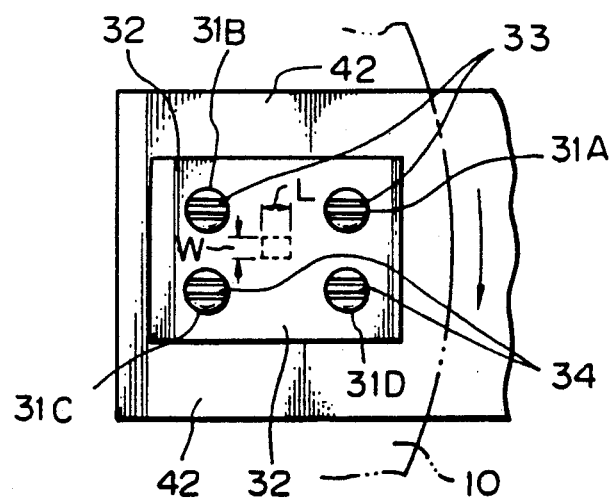
FIG. 4 is a plan view taken along the line IV—IV of FIG. 2.
Figure 5:
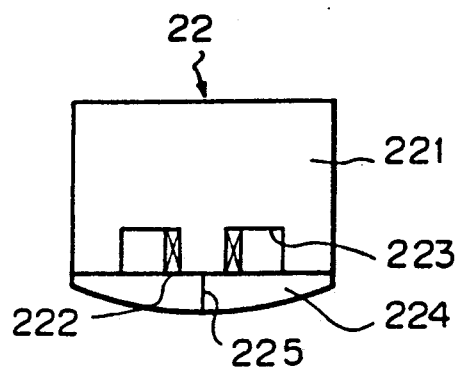
FIG. 5 is a cross-sectional view of a magnetic recording and retrieving head that can be accommodated in the magnetic head assembly of FIG. 2.

FIGS. 2 through 5 show a magnetic head assembly for a flexible magnetic disk drive unit according to a first embodiment of the present invention, which can be used with, for example, the flexible metallic thin-film type perpendicular magnetic recording medium 10 as shown in FIG. 1. The magnetic head assembly has a carriage 40 which is moved relative to the perpendicular magnetic recording medium 10 when driven by a drive source M, such as a conventional stepping motor, via a feed screw mechanism, in the same manner as the conventional carriage. The carriage 40 has an upper arm 41 and a lower arm 42 which laterally extends from a column 43. The upper arm 41 is fixedly attached to an upper end of the column 43 and is biased by a hinged leaf spring 44 toward the lower arm 42. A magnetic recording head portion 20 is held by the upper arm 41, preferably via a suitable resilient plate-like holder 45 (FIG. 3), and is provided with a head-penetration setting mechanism 21 utilizing a conventional micrometer and a magnetic recording and retrieving head 22 connected to the head-penetration setting mechanism 21. That is, the magnetic recording and retrieving head 22 is vertically moved toward and away from the upper face of the inserted flexible magnetic recording medium 10 by the head-penetration setting mechanism 21, to finely adjust the vertical position of the head 22. The magnetic recording head portion 20 is placed in elastic contact with the inserted flexible magnetic recording medium 10 by the hinged leaf spring 44 and the resilient characteristics of the flexible magnetic recording medium 10 per se. As best shown in FIG. 5, the magnetic recording and retrieving head 22 is constructed as a main-pole excitation type perpendicular magnetic recording and retrieving head, and is provided with a ferrite block 221 with an annular groove 223 at one end thereof for receiving therein an exciting coil 222, and a main magnetic pole 225 arranged in a head-slider 224 firmly connected to the end of the ferrite block 221. As shown in FIG. 4, the head 22 has a rectangular cross-sectional configuration 1.9 mm in width (W) and 1.3 mm in length (L) and a spherical contact end having a radius of curvature of approximately 10 mm.

A pad unit 30 is held on the lower arm 42, and is provided with four button-type supporting pads 31A, 31B, 31C, and 31D, to support four positions of the flexible magnetic recording medium 10 from a side opposite to the side on which the magnetic recording and retrieving head 22 is arranged. The four supporting pads 31A, 31B, 31C, and 31D are fixedly seated on a support bed 32, and in the present embodiment, the four supporting pads 31A, 31B, 31C, and 31D are disposed at four corner points of a rectangle surrounding a contact position where contact between the main magnetic pole 225 of the head 22 and the flexible magnetic recording medium 10 takes place, as best shown in FIG. 4. Each of the supporting pads 31A, 31B, 31C, and 31D is formed by, for example, crystallized fluorine containing glass cylinder 3 mm in dia. and 1.5 mm in height, and has an end contact face generally in the shape of a spherical surface having a radius of curvature of 30 mm to prevent a concentration of an impact force on the end contact face while in contact with the flexible magnetic recording medium 10. Alternatively, from the point of view of preventing an impact force concentration, the end of each of the supporting pads 31A, 31B, 31C and 31D may be formed in a shape having two symmetrical oblique faces with a top narrow flat contact face, a semi-barrel shape with a small flat contact end face, or a truncated pyramid shape with a small square flat contact end face.

At this stage, it should be understood that each of the supporting pads 31A through 31D can be referred to as a solid pad when compared with the conventional soft pads, for example, the animal skin pads.

Preferably, the end contact face of each supporting head 31A, 31B, 31C or 31D is formed with slots or grooves 33 on both sides of the central contact area 34 (0.2 mm in width) with respect to the rotational direction (see the arrow in FIGS. 3 and 4) of the flexible magnetic recording medium. The slots and grooves 33 are formed to trap dust and other foreign material during contact between the supporting pads 31A through 31D and the flexible magnetic recording medium. Each of the slots 33 is approximately 0.2 mm in width and approximately 0.5 mm in depth. The spacing between the centers of the supporting pads 31A and 31D or 31B and 31C in the direction of the circumferential direction of the medium 10 is set at 5 mm, and the spacing between the centers of the supporting pads 31A and 31B or 31D and 31C in the radial direction of the medium 10 is set at 9 mm.

The present inventors have conducted experimental tests to evaluate the retrieving characteristics of the magnetic head assembly of the above-mentioned first embodiment. The assembly was built into a commercially available 3.5 inch floppy disk drive unit, and the above-mentioned perpendicular magnetic recording medium 10 encased in a commercially available 3.5 inch hard jacket was inserted into the assembly.

Figure 6:
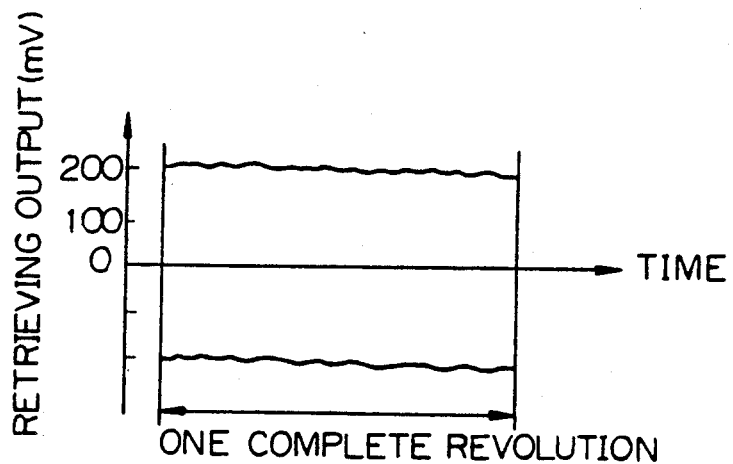
FIG. 6 is a graphical view of the enveloped curve of the retrieving output signal derived from the magnetic head assembly of FIGS. 2 through 4.

FIG. 6 illustrates the results of the measurements of the retrieving characteristics of the magnetic head assembly. That is, the curves in FIG. 6 are envelopes of the retrieving output signals obtained from the magnetic recording and retrieving head 22 set at a position 35 millimeters radially from the center of the rotation of the medium 10, under a later-described head penetration, during one complete revolution of the medium 10. From the illustration of the measured curves, it will be obvious that the modulation can be less than 10%, and that the carrier to noise ratio (C/N) at a carrier frequency was 54.5 dB. The measurement was conducted by the employment of an appropriate instrument, i.e., a spectroanalyzer TR-4171 manufactured and sold by Takeda Riken Co., Ltd. of Japan, under the measuring conditions of a 10 KH$_Z$ RBW (Resolution Band Width) and a 100 KH$_Z$ VBW (Video Band Width).

When the head 22 was set in positions 40 millimeters and 30 millimeters radially from the center of rotation of the 3.5 inch medium 10, the noise index (C/N) at a carrier frequency was 55 dB and 53.5 dB, respectively. The envelopes of the retrieving output signals were as stable as those shown in FIG. 6.

Figure 7:
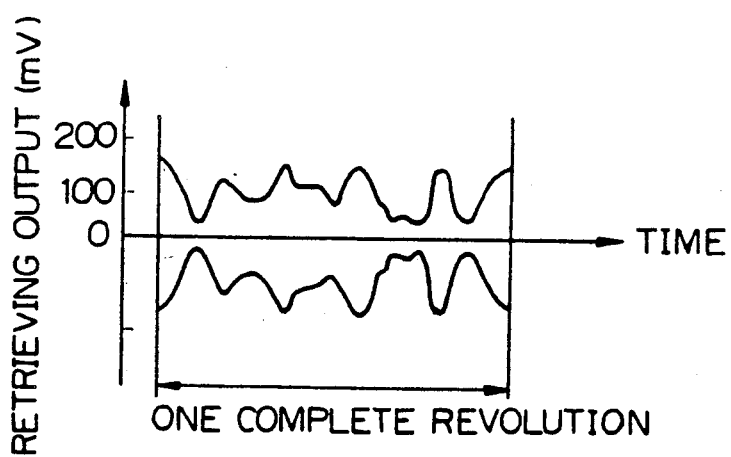
FIG. 7 is a graphical view of the enveloped curve of the retrieving output signal derived from a magnetic head assembly according to the prior art.

On the other hand, FIG. 7 illustrates a result of a measurement of the magnetic retrieving characteristics in the case where the button-shaped main pole excitation type perpendicular magnetic head 22 was pressed against the medium 10 to carry out the magnetic retrieving without support by any supporting pad. That is, the case of FIG. 7 corresponds to the prior art supporting system of the magnetic head assembly. From the illustration of FIG. 7, it will be easily understood that, in the prior art supporting system the spacing between the head and the medium is not stable, and that the retrieving characteristics is not equalized in the circumferential direction of the medium 10.

From a comparison between the results of FIGS. 6 and 7, it will be readily understood that the magnetic head assembly according to the first embodiment of the present invention exhibits extremely stable magnetic retrieving characteristics.

Figure 8:
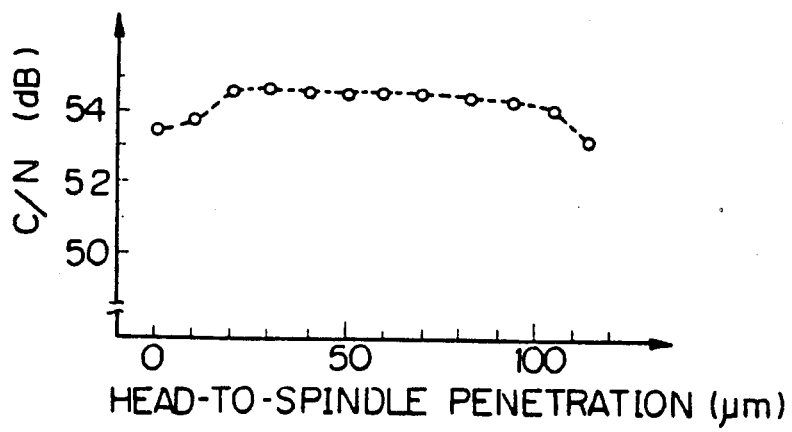
FIG. 8 is a graphical view of the relationship between the carrier to noise ratio C/N on the basis of the retrieving output signal and the head-to-spindle penetration of the magnetic recording and retrieving head according to the first embodiment.

FIG. 8 illustrates the result of a measurement for evaluating the stability of the contact between the magnetic head assembly of the present invention and the recording medium with respect to a change in the head-to-spindle penetration, i.e., the amount of pressure imposed by the head 22 against the face of the flexible magnetic recording medium 10 from a reference position where the medium 10 is set on the spinning spindle of the floppy disc drive unit. The ordinate of the graph of FIG. 8 indicates the carrier to noise ratio C/N (dB), and the abscissa indicates the change in the amount of head-to-spindle penetration. From the illustration of FIG. 8, it will be readily understood that the curve is almost flat over a wide range of the change in the head-to-spindle penetration (0 through 100 microns in the case of the present measurement). As a result, it is obvious that, in accordance with the magnetic head assembly of the present invention, the contact between the head 22 and the medium 10 is stable regardless of any change in the head-to-spindle penetration. Therefore, in accordance with the present invention, a stable recording and retrieving can be guaranteed even if there is a change in the face characteristics of the medium 10, and thus the magnetic head assembly of the present invention is always able to exhibit constant and stable recording and retrieving characteristics regardless of an exchange of one medium 10 for another.

Further, with regard to the durability of the magnetic head assembly according to the present invention as well as the magnetic recording medium, it was confirmed by a test employing the head assembly of the above-mentioned first embodiment that the retrieving output level is substantially unchanged even after the flexible magnetic recording medium 10 was subjected to a specified number of turns, i.e., the 3 millions turns specified in the Japanese Industrial Standard as a reference index to indicate a typical level in practical use.

Figure 9A:
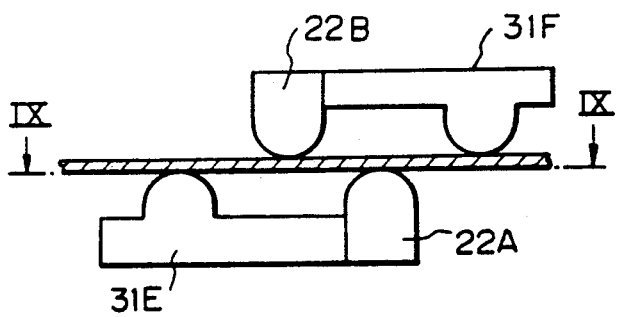
FIG. 9A is a cross-sectional view off a magnetic head assembly for double sided recording and retrieving, according to a second embodiment of the present invention.
Figure 9B:
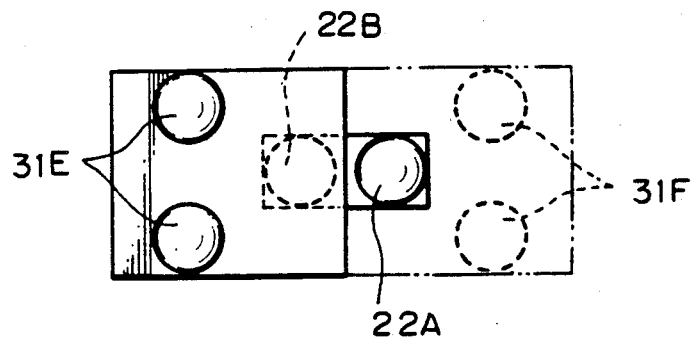
FIG. 9B is a plan view taken along the line IX—IX of FIG. 9A.

FIGS. 9A and 9B illustrate a magnetic head assembly according to a second embodiment of the present invention, which is provided with a magnetic recording and retrieving head unit having a pair of magnetic recording and retrieving heads, one for carrying out recording onto and retrieving from one of both sides of the flexible magnetic recording medium 10, and the other for carrying out recording onto and retrieving from the other of both sides of the flexible magnetic recording medium 10. The magnetic recording and retrieving head unit of the magnetic head assembly of the second embodiment includes a pair of perpendicular magnetic recording and retrieving heads 22A and 22B, supporting pads 31E supporting the recording medium 10 from the underside, and supporting pads 31F supporting the recording medium 10 from the upper side. Each of the heads 22A and 22B may be of the same construction as the head 22 of the first embodiment, shown in FIG. 5, and each of the supporting pads 31E and 31F may be of the same construction as the supporting pads 31A through 31D. At this stage, it should be understood from the illustration of FIG. 9B that, in the disposition of the second embodiment, the heads 22A and the supporting pads 31E cooperate to provide a three-point support for the head 22B, and that the heads 22B and the supporting pads 31F cooperate to provide a three-point support for the head 22. That is, each of the magnetic recording and retrieving heads 22A and 22B is disposed so as to carry out a supporting function in addition to recording and retrieving functions. Thus, the magnetic head assembly can be made very compact.

Figure 10A:
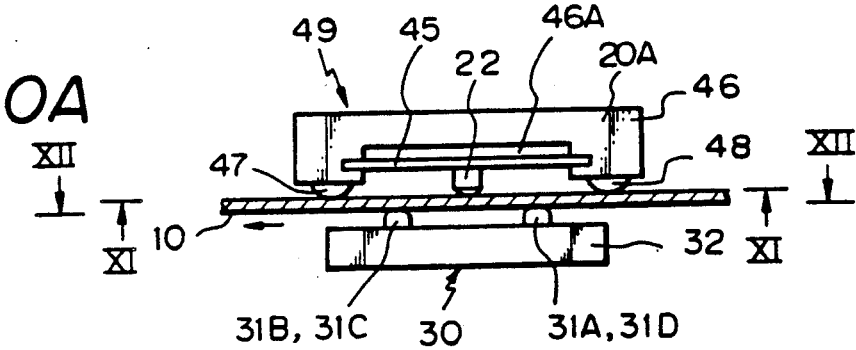
FIG. 10A is a cross-sectional view of a magnetic head assembly according to a third embodiment of the present invention.
Figure 11:
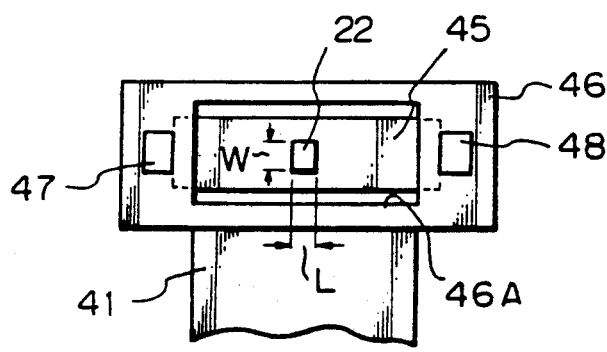
FIG. 11 is a plan view taken along the line XI—XI of FIG. 10A.
Figure 12:
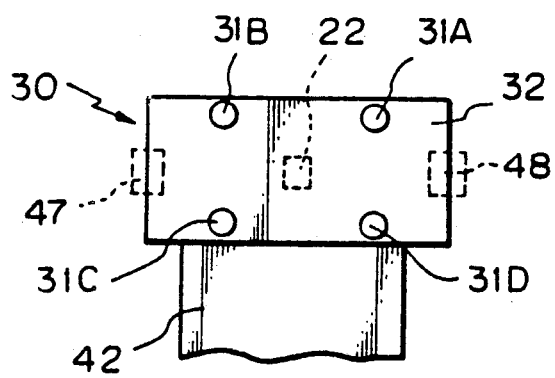
FIG. 12 is a plan view taken along the line XII—XII of FIG. 10A.

FIGS. 10A, 11 and 12 illustrate a magnetic head assembly according to a third embodiment of the present invention, which has a first set of supporting pads for supporting a plurality of positions of a metallic thin-film type flexible magnetic recording medium and a second set of pads for restricting or suppressing an undulating motion of the medium during the rotation thereof.

In the magnetic head assembly of the third embodiment, the same or like elements and parts as in the magnetic head assembly of the first embodiment are designated by the same reference numerals.

Figure 10B:
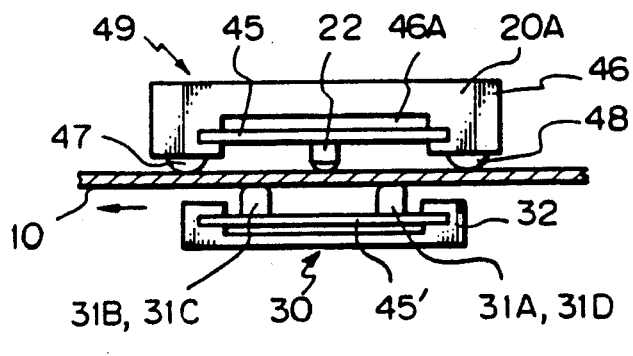
FIG. 10B is a cross-sectional view of a magnetic head assembly slightly modified from the assembly of FIG. 10A.

The magnetic head assembly has a head unit 20A and a pad unit 30 arranged on both sides of a metallic thin-film type flexible magnetic recording medium corresponding to the recording medium 10 of FIG. 1. The metallic thin-film type flexible magnetic recording medium 10, therefore, can be considered to be, for example, a 3.5 inch, 5¼ inch or 8.0 inch flexible perpendicular magnetic recording disk. The head unit 20A is provided with a bracket-like head seat 46 having a central recessed portion 46A and a leaf spring plate 45 on which a single magnetic recording and retrieving head 22 is held. The leaf spring plate 45 may be made of a phosphor bronze plate 100 microns thick, 3 mm in width, and 15 mm in length. The head unit 20A is also provided with a second set of suppressing pads 47 and 48 arranged to be spaced apart from one another and located on both sides of the head 22 in the direction of rotation (see the arrow in FIG. 10) of the recording medium 10. Further, the suppressing pads are located outward of the later-described first set of supporting pads 31A through 31D with respect to the head 22, as will be understood from the illustration of FIGS. 10A and 12. The head seat 46 of the head unit 20A is attached to an upper arm 41 of a carriage 40, which corresponds to the carriage 40 of the first embodiment of FIGS. 2 through 4. A pad unit 30 attached to a lower arm 42 to the carriage 40 is provided with a support bed 32 on which four supporting pads 31A through 31D are mounted so as to support four positions surrounding a contact position at which contact between the head 22 and the flexible recording medium 10 takes place. Alternatively, as shown in FIG. 10B, the supporting pads 31A through 31D may be mounted on the support bed 32 via a leaf spring plate 45'. It should be understood that the head unit 20A and pad unit 30 are adjustably arranged in parallel with one another with an adjustable spacing therebetween. Thus, it is also possible to adjust the amount of penetration of the head 22 toward the face of the flexible recording medium 10 as well as the contact force of the suppressing pads 47 and 48, thereby adjusting the amount of undulation of the flexible recording medium 10. The magnetic recording and retrieving head 22 is preliminarily set so that a contact end of the head 22 is projected by 10 through 100 microns more than contact ends of the suppressing pads 47 and 48 toward the face of the flexible recording medium 10. The amount of the projection of the head 22 is determined by the impact force between the flexible recording medium 10 and the head 22 and the supporting pads 31A through 31D, and by the stability in the level of the recording and retrieving signals derived from the head 22. The head 22 accommodated in the assembly of the present embodiment is substantially the same as the head of the first embodiment of FIGS. 2 through 5.

The first set of supporting pads 31A through 31D are the same as those of the first embodiment.

The second set of suppressing pads 47 and 48 which may also be considered as solid pads, are made of a carbon material, e.g., manufactured by Tohoku Kyowa Carbon Co., Ltd. of Japan and sold by the same company under the trade name of "METAPHITE". Each of the suppressing pads 47 and 48 has a rectangular cross-sectional configuration 2.0 mm in width and 1.5 mm in length and a flat contact end chamferred on, all edges thereof. The suppressing pads 47 and 48 are preferably held on the head seat 46 via an appropriate leaf spring (not shown) and are set so that the amount of projection of the contact end toward the face of the flexible medium 10 is less than that of the head 22 by, e.g., approximately 50 microns, as described before. The spacing between each of the suppressing pads 47 and 48 and the center of the head 22 is set at approximately several millimeters, e.g., 6 mm.

Figure 13:
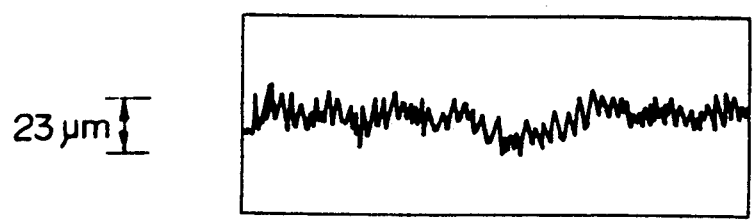
FIG. 13 is a graphical view of the modulation amount of the flexible magnetic recording disk tested by the magnetic head assembly of FIGS. 10 through 12.

The present inventors have conducted experimental tests to evaluate the durability characteristics of the magnetic head assembly of the above-mentioned third embodiment. The assembly was built into a commercially available 3.5 inch floppy disk drive unit, and the above-mentioned perpendicular magnetic recording medium 10 encased in a commercially available 3.5 inch hard jacket was inserted into the assembly. At this stage, the amount of maximum undulation of the flexible recording medium 10 was set at approximately 20 microns, as shown in FIG. 13, with the condition that the magnetic head 22 was not provided in the drive unit. The magnetic head 22 was then assembled into the drive unit, and the penetration of the head 22 was adjusted so that the retrieving output signal derived from the head 22 had an even enveloped signal curve. Further, after conducting a saturated recording at 70 KFRPI, the retrieving was repeatedly conducted to test the durability of the retrieving signal level. As a result, it was confirmed that the signal level was lowered by only 1 dB per 3 million rotations. Thus, it was confirmed that, due to the provision of the suppressing pads 47 and 48 according to the present embodiment, the magnetic head assembly exhibits an excellent durability.

Figure 14A:
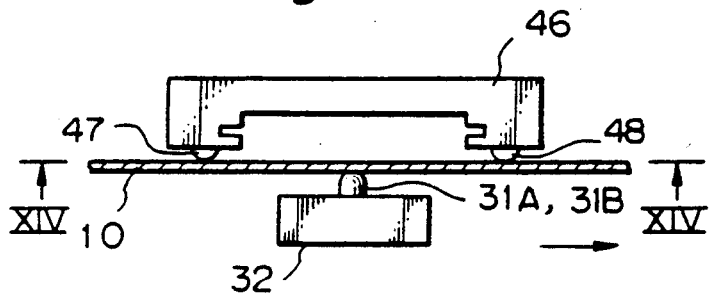
FIG. 14A is a cross-sectional view of another magnetic head assembly according to the present invention.
Figure 14B:
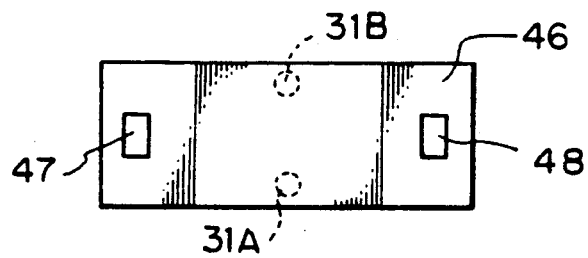
FIG. 14B is a plan view taken along the line XIV—XIV of FIG. 14A.

The durability test was further conducted with regard to a further magnetic head assembly according to the present invention, as shown in FIGS. 14A and 14B, in which two supporting pads 31A and 31B and two suppressing pads 47 and 48 were accommodated without the magnetic head 22. The supporting pads 31A and 31B are spaced with a distance of 9 mm from the center of the pad 31A to that of the pad 31B in the radial direction of the flexible medium 10. The shape and material of the supporting pads 31A and 31B were the same as those of the pads 31A through 31D of the embodiment of FIGS. 10 through 12. The suppressing pads 47 and 48 were also made of the same material as those of the embodiment of FIGS. 10 through 12. Each of the suppressing pads 47 and 48 has the shape of a flat plate 4 mm in width, 4 mm length, and 0.5 mm thick. All edges of each pad 47 or 48 were chamferred. Each of the two suppressing pads 47 and 48 was arranged on the head support 46 so as to be spaced 6 mm from a position where the magnetic head 22 should be held. Since the durability test and the test of the undulation characteristics were to be conducted, a magnetic head 22 was not accommodated in the magnetic head assembly.

The magnetic head assembly of FIGS. 14A and 14B was then assembled into a conventional 3.5 inch floppy disk drive unit, and the above-mentioned tests were conducted using the same flexible magnetic recording medium 10 as that used in the test of the embodiment of FIGS. 10 through 12.

Figure 15:
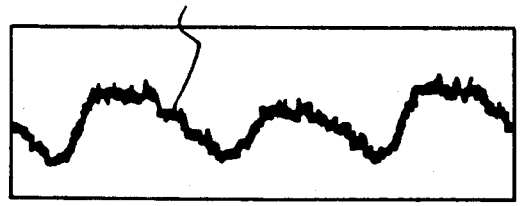
FIG. 15 is a graphical view of the modulation amount of the flexible magnetic recording disk tested by the magnetic head assembly of FIGS. 14A and 14B.

The amount of undulation of the medium 10 was adjusted to a level shown in FIG. 15 (maximum undulation, 55 microns), and the flexible medium 10 was rotated at a speed of 600 r.p.m. for 13 million rotations. As a result, it was confirmed that the supporting and suppressing pads 31A, 31B, 47 and 48 and both faces of the medium 10 were not damaged in any way, for example, by scratching.

Figure 16:
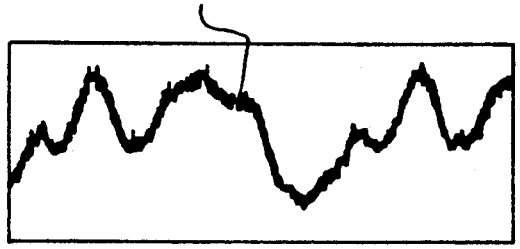
FIG. 16 is a graphical view of the modulation amount of the flexible magnetic recording disk tested by the magnetic head assembly of the prior art.

The medium 10 was then inserted into a conventional commercially available 3.5 inch jacket, and was subjected to a similar durability test. The amount of undulation of the medium 10 in the jacket was as shown in FIG. 16. That is, due to the undulation suppression by the conventional soft liner, the maximum undulation of the medium 10 was 110 microns. As a result of the test, after 3 million rotations, many dirty marks appeared on the faces of the medium 10, and after 5 million rotations, a number of scratches appeared on the faces of the medium 10. Therefore, it was confirmed that the durability of the magnetic head assembly according to the present invention is superior to that of the conventional magnetic head, due to the arrangement of a plurality of supporting pads surrounding the contact position of the magnetic head with the flexible magnetic recording medium and the arrangement of a plurality of suppressing pads.

From the foregoing description of the embodiments of the present invention, it will be understood that, in accordance with the present invention, the magnetic head assembly for a flexible magnetic disk drive unit adapted for practical use with a metallic thin-film type flexible magnetic recording medium, especially with a flexible perpendicular magnetic disk having a high recording density, can be realized. That is, the magnetic head assembly of the present invention is able to exhibit a long operational life and improved recording and retrieving characteristics, compared with the magnetic head assembly of the conventional flexible disk drive unit.

FIGS. 17 through 20 illustrate a magnetic recording and retrieving head able to be incorporated into the magnetic head assembly according to the present invention. The magnetic recording and retrieving head of FIGS. 17 through 20 is constructed as a head for carrying out recording onto and retrieving from the flexible magnetic recording medium or disk by the perpendicular magnetization system, as disclosed in U.S. Pat. No. 4,251,842 to Iwasaki et al.

Figure 17:
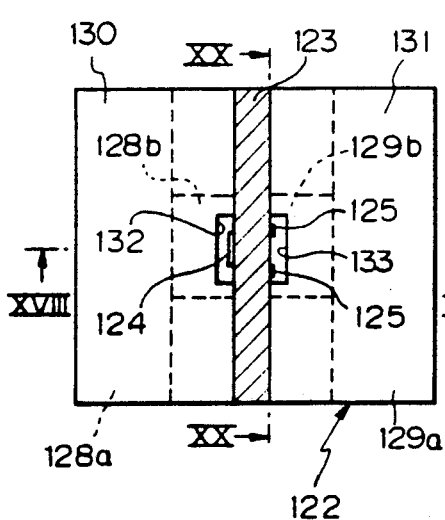
FIG. 17 is a plan view of an improved magnetic recording and retrieving head that can be accommodated in the magnetic head assembly of the present invention.
Figure 18:
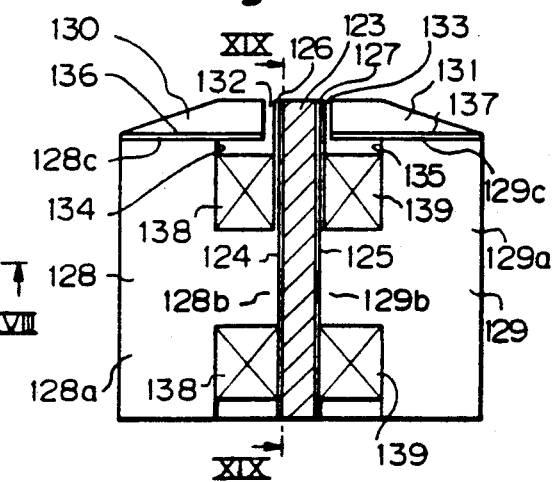
FIG. 18 is a cross-sectional view taken along the line XVIII—XVIII of FIG. 17.
Figure 19:
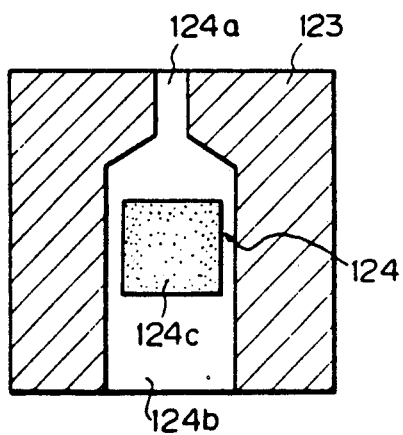
FIG. 19 is a cross-sectional view taken along the line XIX—XIX of FIG. 18.
Figure 20:
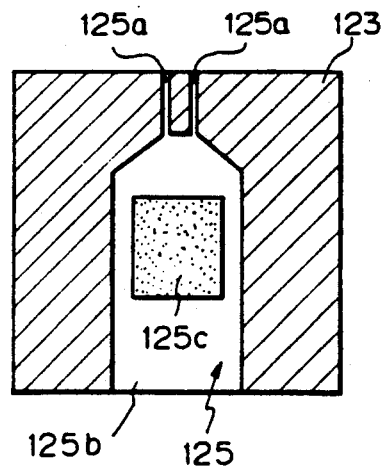
FIG. 20 is a cross-sectional view taken along the line XX—XX of FIG. 17.

Referring to FIGS. 17 through 20, the magnetic recording and retrieving head 122 is provided with a non-magnetic support 123 supporting a main magnetic pole 124 for recording and retrieving, and a main erasing pole 125. The support 123 is constituted by an approximately rectangular plate several millimeters in width and length and approximately less than 100 microns thick, made of crystallized glass, such as that manufactured and sold by Nippon Denki Glass Co., Ltd. of Japan under the name of "Neoceram" (Registered Trademark). Alternatively, the support 123 may be made of non-magnetic and abrasion-resistant material having slidable characteristics and a Vickers hardness of less than 1100, such as glass system ceramics, non-magnetic ferrite system ceramics, potassium titanate, calcium titanate or barium titanate. As best shown in FIG. 18, upper portions of the main poles 124 and 125, i.e., the portions located above later-described core sections 128b and 129b of auxiliary magnetic poles 128 and 129, are covered by protective films 126 and 127 several microns thick. The protective films 126 and 127 are formed by an aluminum oxide ($Al_2O_3$) film, respectively, attached to the faces of the main poles 124 and 125 by the RF sputtering method. The protective films 126 and 127 provide the main poles 124 and 125 with a chemical and mechanical durability. The main recording and retrieving pole 124 has a narrow pole portion 124a at an upper portion thereof and a wide magnetic path portion 124b connected to the lower end of the pole portion 124a. The width of the pole portion 124a of the main pole 124 corresponds approximately to that of the track of a magnetic recording and retrieving medium (not shown). The main erasing poles 125 have a pair of pole portions 125a arranged on both sides of the pole portion 124a of the main magnetic recording and retrieving pole 124, and a wide magnetic path portion 125b. The pair of pole portions 125a are spaced apart from one another at a distance corresponding approximately to the width of the above-mentioned track of the magnetic recording and retrieving medium. Both main poles 124 and 125 are formed of a soft magnetic thin-film such as permalloy film, sendust film or cobalt system amorphous alloy having a high magnetic permeability. The main poles 124 and 125 are formed of, for example, an amorphous magnetic film made of a Co-Nb-Zr alloy. The thick plate-like auxiliary magnetic poles 128 and 129 are arranged on both sides of the support 123. The auxiliary magnetic pole 128 has a body portion 128a and a central core portion 128b formed as a coil mount, and a magnetic path magnetically connected to the main magnetic recording and retrieving pole 124. The core portion 128b is bonded by a suitable adhesive to a central portion 124c (FIG. 19) of the main magnetic recording and retrieving pole 124. The auxiliary magnetic pole 129 has a body portion 129a and a central core portion 129b formed as a coil mount, and a magnetic path magnetically connected to the main erasing pole 125. The core portion 129b is bonded to a central portion 125c (FIG. 20) of the main magnetic erasing pole 125. The auxiliary magnetic poles 128 and 129 may be both made of a ferrite material.

On upper faces 128c and 129c are fixedly mounted sliders 130 and 131, which are arranged so as to sandwich the support 123 in a direction corresponding to the sliding or direction of rotation of the flexible magnetic recording medium. The sliders 130 and 131 are centrally formed with recesses 132 and 133, respectively, as shown in FIGS. 17 and 18. The width of each of the recesses 132 and 133 in the direction perpendicular to the sliding direction of the flexible magnetic recording medium is larger than those of the main poles 124 and 125 (see FIG. 17), and the depth of each of the recesses 132 and 133 in the direction corresponding to the sliding direction of the flexible magnetic recording medium is approximately more than 10 microns and less than 100 microns. As shown in FIG. 18, the two recesses 132 and 133 communicate with upper vacancies 134 and 135 formed between the support 123 and the body portions 128a and 129a. Therefore, these recesses 132 and 133 are able to receive and trap dust and abrasive powder produced between the head 122 and the flexible magnetic medium during the recording and retrieving operation of the head 122, and other foreign material. That is, due to the provision of the recesses 132 and 133, the top faces of the sliders 130 and 131 are always clean, resulting in an increase of the durability of the head 122 per se as well as the recording medium 10. Also, a stable recording and retrieving operation of the magnetic recording head 122 is ensured. The sliders 130 and 131 may be made of the same material as the sliders of the conventional magnetic head. However, the sliders are preferably made of an abrasion-resistant material having a Vickers hardness of more than 1500, to ensure a sufficient durability while in use with a metallic thin-film type flexible magnetic recording medium. Therefore, alumina-titanium-carbide ($Al_2O_3$-TiC), SiC-$ErO_2$, SiC, $Si_3N_4$ or $Al_2O_3$-$ZrO_2$ are preferably employed for the sliders 130 and 131. Between the sliders 130 and 131 and the upper faces 128c and 129c of the auxiliary magnetic poles 128 and 129 are interposed soft magnetic layers 136 and 137 made of permalloy film, which function as magnetic return paths, respectively. The provision of the soft magnetic layers 136 and 137 enhances the recording and retrieving sensitivity of the magnetic head 122. A magnetic recording and retrieving excitation coil 138 is wound around the core portion 128b, and a magnetic erasing excitation coil 139 is wound around the core portion 129b.

The present inventors conducted a durability test of the above-described magnetic recording and retrieving head 122 using the flexible magnetic recording medium explained in FIG. 1, and confirmed that, after 6 million rotations, although the recesses 132 and 133 were contaminated, the upper faces of the support 123 and sliders 130 and 131 were not contaminated at the central areas thereof, i.e., only the ends of the upper faces of the support 123 and sliders 130 and 131 were slightly contaminated.

In accordance with the magnetic recording and retrieving head 122 of the present invention, the following advantages are provided (1) Due to the provision of the recesses before and after the main poles in the direction of rotation of the flexible magnetic recording medium, self-cleaning of the magnetic recording and retrieving head is always carried out during the recording and retrieving operation of the head, and thus the durability of the head and the magnetic recording medium are improved.

(2) Since the support 123 is made of a non-magnetic material having a Vickers hardness of less than 1100, and since the slides 130 and 131 are made of a slidable and abrasion-resistant material having a Vickers hardness of more than 1500, the head has a long operation life and can be easily manufactured.

(3) It is possible to reduce the dimensions of the top of the head, i.e., less than 1 mm in width and length, and to constantly maintain a stable contact between the head and the medium.

(4) Since a magnetic path is formed around the main poles, the recording and retrieving sensitivity is excellent, without disturbance from the environment.

(5) It is possible to construct a magnetic recording and retrieving head in which the magnetic recording and retrieving functions can be separated.

(6) It is possible to construct a magnetic recording and retrieving head having an erasing head, which is indispensable for use with a flexible magnetic recording disk.

Figure 21:
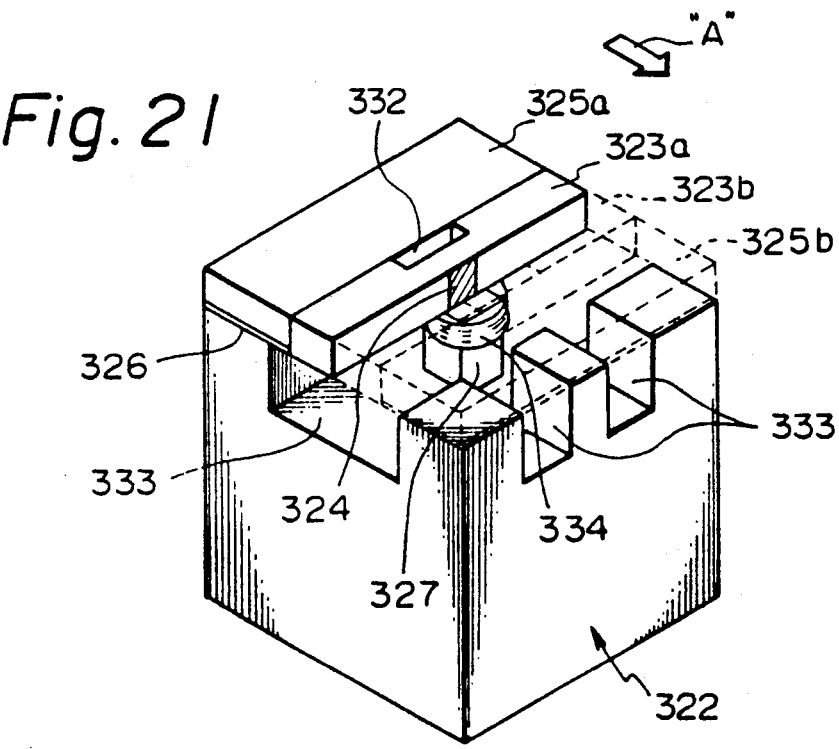
FIG. 21 is a perspective view of a further improved magnetic recording and retrieving head that can be accommodated in the magnetic head assembly of the present invention.

FIG. 21 illustrates another magnetic recording and retrieving head with recesses for trapping dust and foreign materials, constructed as a single pole type magnetic head for carrying out recording onto and retrieving from a flexible magnetic recording medium or disk, particularly a flexible metallic thin-film type perpendicular magnetic recording medium, by the perpendicular magnetization system.

The magnetic head 322 of FIG. 21 has a main magnetic pole 324 held by symmetrically disposed supports 323a and 323b. The magnetic pole 324 is formed of a Co-Zr-Nb magnetic alloy film attached to an inner surface finished face of the support 323a by sputtering. The supports 323a and 323b are connected together by an adhesive, such as an epoxy resin, while sandwiching the main magnetic pole 324 therebetween. The supports 323a and 323b are made of, for example, glass system ceramics. The supports 323a and 323b may be made of non-magnetic ferrite, potassium titanate, calcium titanate or barium titanate. It is important that the non-magnetic material of the supports 323a and 323b has a Vickers hardness of less than 1100, so that difference of the hardness between the supports and the main magnetic pole 324 is kept as small as possible, and so that the supports can be easily manufactured. The supports 323a and 323b are formed with a recess 332 (only the recess of the support 323a is shown), respectively, on respective sides thereof opposite to the sides sandwiching the main magnetic pole 324. The recesses 332 are communicated with grooves 333 provided for an auxiliary magnetic pole 328, and are provided for trapping dust and other foreign materials during the magnetic recording and retrieving operations of the head 322. An arrow A indicates a direction in which a flexible magnetic recording medium (not shown) rotates or slides while in contact with the top face of the magnetic recording and retrieving head 322. The width of the recesses 332 in the direction perpendicular to the direction of rotation of the medium are determined to be larger than that of the main magnetic pole 324. An excitation coil 334 is seated on a main magnetic pole bed 327.

Outer supports 325a and 325b are arranged outward of the above-mentioned supports 323a and 323b in the direction of rotation of the medium. These outer supports 325a and 325b are made of a non-magnetic abrasion-resistant material having a Vickers hardness of more than 1500, so that the durability of the head is increased. For example, alumina-titanium-carbide (Al$_2$O$_3$-TiC), SiC-ErO$_2$, SiC, Si$_3$N$_4$ or Al$_2$O$_3$-ZrO$_2$ may be used for forming the outer supports 325a and 325b. The outer supports 325a and 325b are attached to the upper faces of the auxiliary magnetic pole 328, via a highly magnetic permeable film 326 formed of, e.g., conventional permalloy. The inwardly arranged supports 323a and 323b and the outer supports 325a and 325b are combined to form a combined rectangular plate-like support 2 mm in width, 2 mm in length, and approximately 100 microns thick, and positioning the main magnetic pole 324 onto the main magnetic pole bed 327. The uppermost face of the combined rectangular plate-like support is finished by polishing to a spherical surface having a radius of curvature of equal to or less than 200 mm.

In accordance with the above-described construction of the magnetic recording and retrieving head 322, the recesses 332 can trap dust and other foreign materials. Therefore, an accumulation of dust and foreign material between the head 322 and the flexible magnetic recording medium can be prevented. As a result, the durability of the head 322 per and the recording medium se can be improved, and erroneous recording and retrieving by the head 322 does not occur. Further, the provision of the highly magnetic permeable film 326 effectively increases the sectional area of the magnetic return path, thereby enhancing the sensitivity in recording and retrieving operations of the head 322 while decreasing the noise level.

Figure 22:
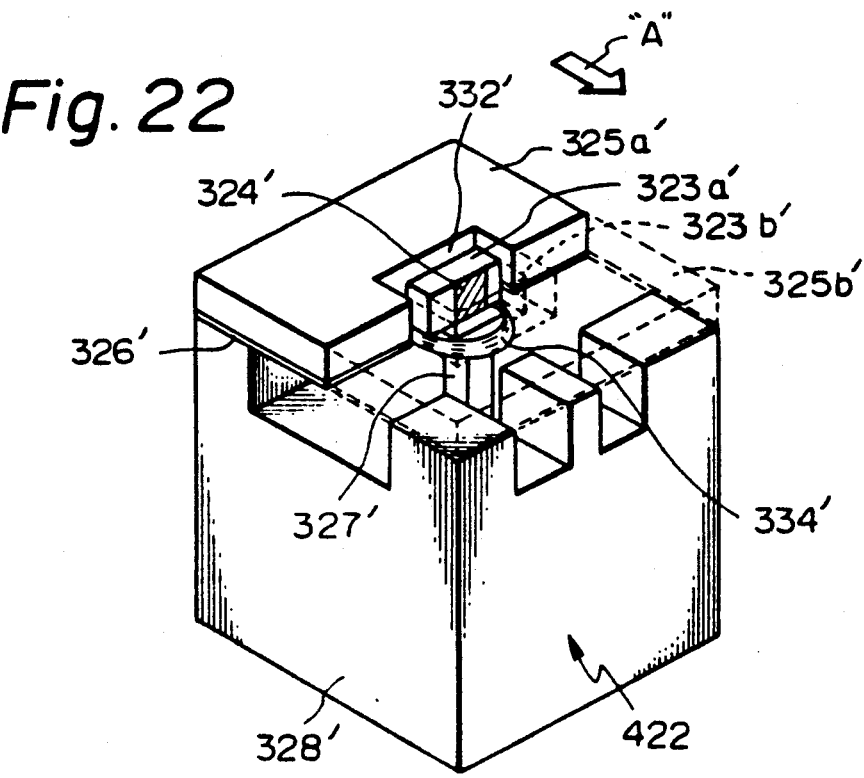
FIG. 22 is a perspective view of a still further improved magnetic recording and retrieving head that can be accommodated in the magnetic head assembly of the present invention.
Figure 23:
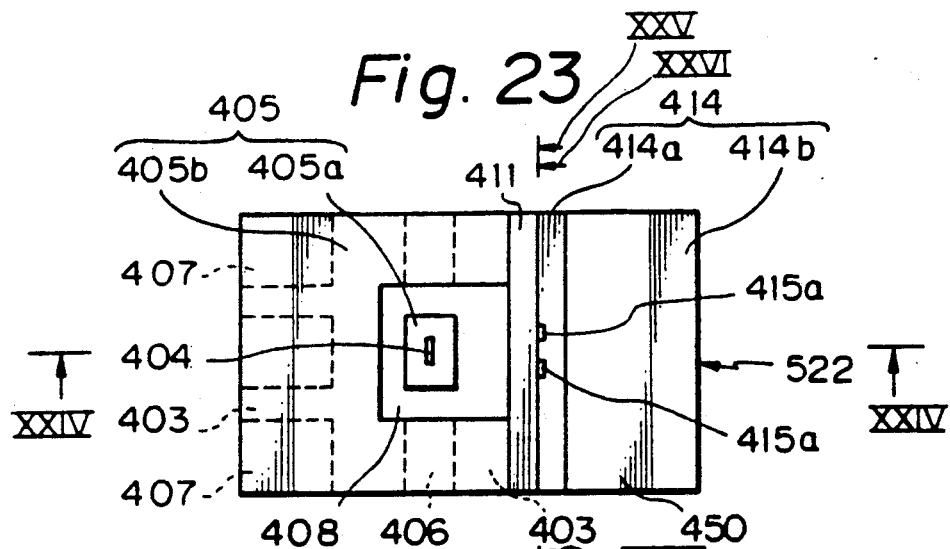
FIG. 23 is a plan view of another improved magnetic recording and retrieving head that can be accommodated in the magnetic head assembly of the present invention.
Figure 24:
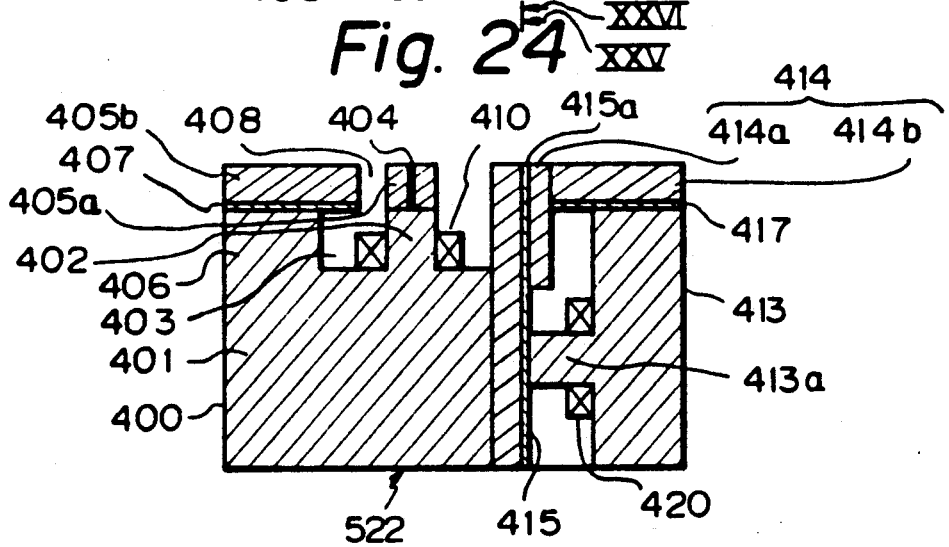
FIG. 24 is a cross-sectional view taken along the line XXIV—XXIV of FIG. 23.

FIG. 22 illustrates a further magnetic recording and retrieving head according to the present invention. The head 422 of FIG. 22 is different from that of FIG. 21 in that the area of the highly magnetic permeable film 326' is greater than that of the highly magnetic permeable film 326. That is, supports 323a' and 323b' holding therebetween a main magnetic pole 324' are formed as a plate smaller than the plate of the supports 323a and 323b of the head 322, and outer supports 325a' and 325b' are formed as a plate larger than the plate of the supports 325a and 325b of the head 322. The smaller supports 323a' and 323b' are fixed to the top of a main magnetic pole bed 327', and the outer supports 325a' and 325b' are attached to the top of an auxiliary magnetic pole 328', via the highly magnetic permeable film 326, thus forming a larger magnetic return path area than that of the highly magnetic permeable film 326 of the previously-described head 322. The large magnetic return path area of the film 326' is effective for enhancing the sensitivity in the recording and retrieving operation of the head 422 and the resistance to disturbance from the environment of the head 422.

Further, a recess 332' is formed as a pocket-like groove enclosing small supports 323a' and 323b'. The pocket-like groove 332' is more effective for trapping dust and other foreign materials during the recording and retrieving operations of the head 422.

An excitation coil 334' is the same as the coil 334 of the head 322, and is seated on the bed 327'.

FIGS. 23 through 26 illustrate a further embodiment of a magnetic recording and retrieving head that can be accommodated in the magnetic head assembly of the present invention.

The magnetic recording and retrieving head 522 is constructed as a head for carrying out a perpendicular magnetization for a flexible metallic thin-film type magnetic recording medium, such as the medium 10 of FIG. 1.

The magnetic recording and retrieving head 522 has a first magnetic pole portion 400 and a second magnetic pole portion 450. The first magnetic pole portion 400 includes a first auxiliary magnetic pole portion 401 having a main magnetic pole bed 402 surrounded by a recessed vacant portion 403, a main magnetic pole 404, a first excitation coil 410 wound around the main magnetic pole bed 402, and a slider 405 formed by an inner slider 405a supporting the main magnetic pole 404, and an outer slider 405b secured to an upper portion 406 of the auxiliary magnetic pole portion 401, via a highly magnetic permeable film 407. The highly magnetic permeable film 407 made of, e.g., permalloy, is arranged to form a magnetic return path as well as to prevent magnetic interference between the first magnetic pole portion 400 and the second magnetic pole portion 450. The formation of the recessed vacant portion 403 in the upper portion of the outer slider 405b also contributes to a prevention of the magnetic interference between the first and the second magnetic pole portions 400 and 450.

The inner slider 405a is made of a non-magnetic and slidable material having a Vickers hardness of less than 1100, such as a glass system or non-magnetic ferrite system ceramics, potassium titanate, calcium titanate, barium titanate or crystallized glass. The inner slider 405a is formed by a pair of plates connected fixedly together. To one end face of the connected plates is attached a first main magnetic pole 404 made of Co-Zr-Nb alloy film by sputtering.

On the other hand, the outer slider 405b is made of a non-magnetic and slidable material having a Vickers hardness of more than 1500, such as alumina-titanium-carbide (Al$_2$O$_3$-TiC), SiC-ErO$_2$, SiC, Si$_3$N$_4$ or Al$_2$O$_3$-ZrO$_2$.

The inner and outer slider 405a and 405b of the slider has a recessed slit 408 connected to the recessed vacant portion 403 formed therebetween. The recessed slit 408 is extended so as to surround the inner slider 405b and is provided for trapping dust and other foreign materials during the recording and retrieving operations of the head 522. One end of the outer slider 405b is attached to a support base 411 interposed between the first and second magnetic pole portions 400 and 450. The support base 411 is made of a non-magnetic material of a suitable thickness, to magnetically isolate the first and second magnetic pole portions 400 and 450 from each other. The support base 411 is also provided as a support for a second main magnetic pole 415 of the second magnetic pole portion 450. Therefore, preferably the support base 411 is made of the same material as that of the inner slider 405a of the first magnetic pole portion 400.

The second magnetic pole portion 450 includes the above-mentioned second magnetic pole 415 made of a Co-Zr-Nb alloy film having a pair of magnetic erasing poles 415a.

The pair of magnetic erasing poles 415a are arranged so as to be spaced apart from one another, to thereby be able to magnetically erase both sides of a track of a flexible magnetic recording medium (not shown).

The second magnetic pole portion 450 also includes a second auxiliary magnetic pole 413 having a connecting portion 413a connected to the second main magnetic pole 415, a second slider 414 formed by a second inner slider 414a secured to the face of the support base 411, and a second outer slider 414b connected to the upper face of the second auxiliary magnetic pole 413, via a high magnetic permeable film 417, and an excitation coil 420. The second inner slider 414a is made of the same material as the inner slider 405a of the first magnetic pole portion 400, i.e., a glass system ceramics. The second outer slider 414b is made of alumina-titanium-carbide ($Al_2O_3$-TiC).

The uppermost face of the head 522 is finished by polishing to a rounded face having an appropriate radius of curvature, e.g., 30 millimeters.

The slit 408 of the head 522 effectively catches dust and other foreign materials, thereby preventing an accumulation of such dust and other foreign materials between the head 522 and the flexible magnetic recording medium. As a result, the head 522 and the recording medium have a long operating life, respectively. Also, the provision of the highly magnetic permeable films 407 and 417 is effective for increasing the magnetic return path area. Therefore, a high sensitivity in the recording and retrieving can be ensured.

Figure 25:
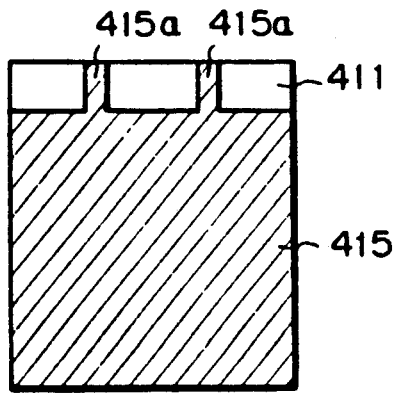
FIG. 25 is a cross-sectional view taken along the line XXV—XXV of FIG. 23.
Figure 26:
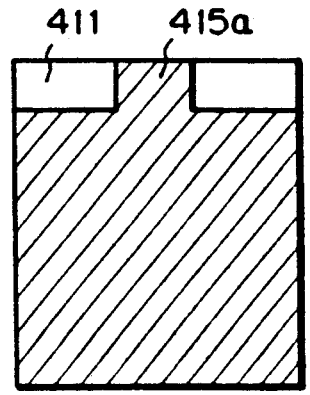
FIG. 26 is a cross-sectional view taken along the line XXVI—XXVI of FIG. 23.

The second magnetic pole 415 may be formed as a magnetic retrieving pole having a single pole 415a as shown in FIG. 26 instead of the pair of magnetic erasing poles 415a shown in FIG. 25.

FIG. 27 illustrates a flexible magnetic recording disk cartridge which can be used with the magnetic head assembly according to the present invention.

The flexible magnetic recording disk cartridge 600 of FIG. 27 has a jacket 615 and a flexible magnetic disk 610 comprised of the same metallic thin-film type flexible magnetic medium as the medium 10 of FIG. 1. The jacket 615 (the hard jacket in the present embodiment) encasing the disk 610 therein is provided with an upper casing 620 and a lower casing 630. The upper casing 620 has four side walls 621 surrounding a rectangular base 622. The rectangular base 622 is formed with a central bore 623, a head window 624, and an indexing hole 625. The lower casing 630 has four side walls 631 surrounding a rectangular base 632. The rectangular base 632 is formed with a central bore 633, a head window 634, and an indexing hole 635. The central bore 623, the head window 624, and the indexing hole 625 of the upper casing 620 are brought into an alignment with the central bore 633, the head window 634, and the indexing hole 635 of the lower casing 630 when both casings 620 and 630 are mated together.

The flexible magnetic disk 610 has a hub member 611 attached to the center of the disk 610 and an index hole 613 detected through the index holes 625 and 635 of the jacket 615. The hub member 611 has a spindle hole 612 in which a drive shaft (not shown) of a flexible magnetic disk drive unit is inserted when the cartridge 600 is set in the drive unit. The hub member 611 is rotatably mounted in the central bores 623 and 633 of the jacket 615 and is rotated together with the disk 610. The hub member 611 has a boss portion 611a used for driving the disk 610 and an annular flange portion 611b to which the flexible disk 610 is fixed, as shown in FIG. 29 or 30. When the flexible disk 610 is assembled in the jacket 615, the annular flange portion 611b of the hub member 611 is held between the upper and lower casings 620 and 630 of the jacket 615. Therefore, the flexible disk 610 is stable in both the direction of the axis of the rotation and in the radial direction; i.e., only a desired amount of play of the disk 610 in the above-mentioned directions is permitted. Thus, the flexible disk 610 is not subjected to any unfavourable force within the jacket 615.

The upper and lower casings 620 and 630 are provided, on the inner faces of the rectangular bases 622 and 632, with cylindrical projections 640 (only the projections 640 on the face of the lower base 632 can be seen in FIG. 27) which are disposed along the outer peripheries of the flexible disc 610 and the hub member 611. These projections 640 are made of a non-magnetic and mechanically durable material similar to the material used for forming the afore-described slide of the magnetic recording and retrieving head, and act to prevent an unstable movement of the flexible disk 610 during the rotation of the disk. Where the disk 610 has a metallic thin-film recording layer, the cylindrical projections 640 should be made of a material having an abrasion-resistant property lower than that of the disk per se. However, the material should not cause condensation of an abrasion powder within the jacket 615. To satisfy these conditions, a fluorine contained crystallized glass is preferably used. The projections 640 also should be formed to have a round or spherical portion (a radius of curvature of 5 through 100 mm) in contact with the outer periphery of the flexible disk. The projections 640 of the upper casing 620 and those of the lower casing 630 are not required to be in alignment with one another. However, the projections 640 must prevent the flexible disk 610 from coming into contact with the inner faces of the bases 622 and 632.

A fixing ring 614 (see FIG. 29 or 30) is provided for fixing the hub member 611 to the flexible disk 610. The fixing member 614 is preferably made of aluminum alloy or other easily machinable metallic material. An engineering plastic material also may be used for forming the fixing ring. In the case of the embodiment of FIG. 29, the fixing ring 614 is cemented to the outer cylindrical face of the boss portion 611a by an appropriate adhesive. The fixing ring 614 of the embodiment of FIG. 30 is threadedly engaged with the boss portion 611a of the hub member 611.

FIG. 28 illustrates another flexible disk cartridge that can be used with the magnetic head assembly of the present invention.

The flexible disk cartridge 600' is different from that of FIG. 27 in that a pair of plate-like pads 642 are provided on each inner face of the upper and lower casings 620 and 630, to restrict any undulation of the disk 610 during the spinning thereof within the jacket 615. The pair of plate-like pads 642 are disposed at positions adjacent to both sides of each head window 624 or 634 so that, when a portion of the disk 610 approaches and moves away from the head windows 624 and 634 during the rotation thereof, an undulation of that portion of the disk 610 is suppressed to a level of at most less than 100 microns. As a result, contact between the disk 610 and the magnetic recording and retrieving head can be lightened. Thus, the mechanical durability of the magnetic head assembly as well as the disk per se can be enhanced, and a stable recording and retrieving can be realized. At this stage, the plate-like pads 642 are preferably made of carbon or glass carbon plate.

Although, the embodiments of FIGS. 27 and 28 are for a flexible disk cartridge encased in the hard jacket, the described constructions may be equally applied to a flexible disk cartridge encased in a soft jacket.

From the foregoing description of the embodiment of the present invention, it will be understood that, according to the present invention, the magnetic head assembly for a flexible magnetic disk drive unit has a long operating life even when used with a metallic thin-film type flexible magnetic recording medium, especially a perpendicular magnetic recording medium. Further, the recording and retrieving characteristics of the magnetic head assembly are improved to a level at which it can be put to practical use.

It should be understood that many changes and variations will occur to those skilled in the art without departing from the scope and spirit of the present invention claimed in the appended claims.

We claim:

1. An apparatus for recording data on or retrieving data from a flexible magnetic disk, said apparatus comprising:
    a frame;
    a magnetic head supported by said frame, said magnetic head being engageable in sliding contact with a first side of the disk to record data on and/or retrieve data from the disk;
    a first suppressing pad supported by said frame on one side of said magnetic head, said first suppressing pad including a substantially flat end surface with a chamfered edge engageable in sliding contact with the first side of the disk for suppressing undulation of the disk during rotation thereof;
    a second suppressing pad supported by said frame on substantially the opposite side of said magnetic head and located an approximately equal distance from the magnetic head as the first suppressing pad, said second suppressing pad including a substantially flat end surface with a chamfered edge engageable in sliding contact with the first side of the disk for suppressing undulation of the disk during rotation thereof; and
    at least two supporting pads, each supporting pad being supported by said frame and including an end surface engageable in sliding contact with the second side of the disk for supporting the disk adjacent to the contact location of said magnetic head, each of said supporting pads including means for preventing the concentration of an impact force on the end surface thereof upon supporting and contacting the second side of the disk, at least one of said supporting pads being located on one side of said magnetic head and at least one of said other supporting pads being located on the other side of said magnetic head in substantially the direction of rotation of the disk, each of said supporting pads being located on the line of an imaginary circle substantially concentric with the center of said magnetic head, the radius of the imaginary circle being less than the distance between each of said suppressing pads and said magnetic head.

2. An apparatus as defined in claim 1, wherein said first and second suppressing pads are located so that a straight line extending between said pads is substantially tangent to the life of a circle having a center coincident with the center of the disk and passing through the center of said magnetic head.

3. An apparatus as defined in claim 1, wherein said frame includes a first mounting arm supporting said magnetic head and said first and second suppressing pads, said first mounting arm being movable with respect to the magnetic disk to position said magnetic head at a desired read/write position on the magnetic disk; and
said frame further includes a second mounting arm supporting said supporting pads, said second mounting arm being movable with respect to the magnetic disk to position said supporting pads with respect to the disk for supporting the disk adjacent to the contact location of said magnetic head.

4. An apparatus as defined in claim 3, said apparatus further comprising:
    a first spring member coupled to said first mounting arm and to said magnetic head to resiliently support said magnetic head in contact with the first side of the disk; and
    a second spring member coupled to said second mounting arm and to said supporting pads to resiliently support said supporting pads in contact with the second side of the disk.

5. An apparatus as defined in claim 4, wherein the free end of said magnetic head extends beyond the plane of the free end of either said first or second suppressing pads to contact the magnetic disk.

6. An apparatus as defined in claim 5, wherein the distance between the free end of said magnetic head and the plane of the free end of either said first or second suppressing pads is within the range of about 5 to 100 um.

7. An apparatus as defined in claim 1, wherein the end surfaces of said first and second suppressing pads and said supporting pads each consist essentially of an abrasion-resistant, thermally conductive non-magnetic material.

8. An apparatus as defined in claim 7, wherein said non-magnetic material includes crystallized glass and alumina ceramics.

9. An apparatus as defined in claim 1, wherein the base portion of each of said suppressing pads has a substantially rectangular cross-section and the base portion of each of said supporting pads has a substantially circular cross-section.

10. An apparatus as defined in claim 1, wherein the means for preventing the concentration of an impact force includes a substantially spherical surface formed as the end surface of said respective supporting pad for engaging the second side of the disk in sliding contact therewith.

11. An apparatus as defined in claim 1, wherein each of said end surfaces of said supporting pads includes at least one recess formed therein, each recess being adapted to trap dust or other foreign material upon the sliding contact of said end surface with the second side of the disk.

12. An apparatus as defined in claim 1, comprising:
four of said supporting pads, two of said supporting pads being located on one side of said magnetic head in substantially the direction of rotation of the disk, and the other two of said supporting pads being located on the other side of said magnetic head in substantially the direction of rotation of the disk; wherein
the end surface of each of said first and second suppressing pads and of said four supporting pads is made essentially of an abrasion-resistant, thermally conductive non-magnetic material.

* * * * *